United States Patent
Ingalls

(10) Patent No.: US 12,554,650 B2
(45) Date of Patent: Feb. 17, 2026

(54) STORE-TO-LOAD FORWARDING FOR PROCESSOR PIPELINES

(71) Applicant: SiFive, Inc., Santa Clara, CA (US)

(72) Inventor: John Ingalls, Sunnyvale, CA (US)

(73) Assignee: SiFive, Inc., Santa Clara, CA (US)

( * ) Notice: Subject to any disclaimer, the term of this patent is extended or adjusted under 35 U.S.C. 154(b) by 0 days.

(21) Appl. No.: 18/747,414

(22) Filed: Jun. 18, 2024

(65) Prior Publication Data

US 2024/0338321 A1    Oct. 10, 2024

Related U.S. Application Data

(63) Continuation of application No. PCT/US2022/051402, filed on Nov. 30, 2022.

(Continued)

(51) Int. Cl.
  *G06F 12/10*     (2016.01)
  *G06F 9/30*      (2018.01)
  *G06F 12/1009*   (2016.01)

(52) U.S. Cl.
  CPC ...... *G06F 12/1009* (2013.01); *G06F 9/30043* (2013.01); *G06F 2212/50* (2013.01)

(58) Field of Classification Search
  CPC .. G06F 9/30043; G06F 12/10; G06F 12/1009; G06F 2212/50; G06F 12/109;

(Continued)

(56) References Cited

U.S. PATENT DOCUMENTS

| | | | |
|---|---|---|---|
| 6,662,280 B1 * | 12/2003 | Hughes | G06F 9/3861 712/E9.048 |
| 11,113,056 B2 * | 9/2021 | King | G06F 9/3826 |

(Continued)

FOREIGN PATENT DOCUMENTS

| | | | | |
|---|---|---|---|---|
| EP | 3091433 A2 * | 11/2016 | | G06F 9/30043 |
| WO | 0135212 A1 | 5/2001 | | |
| WO | WO-2018154435 A1 * | 8/2018 | | G06F 9/30021 |

OTHER PUBLICATIONS

PCT/US2022/051402 , "International Preliminary Report on Patentability", Jul. 4, 2024, 8 pages.

(Continued)

*Primary Examiner* — Pierre Michel Bataille
(74) *Attorney, Agent, or Firm* — Kilpatrick Townsend & Stockton LLP

(57) ABSTRACT

Systems and methods are disclosed for store-to-load forwarding for processor pipelines. For example, an integrated circuit (e.g., a processor) for executing instructions includes a processor pipeline; a store queue that has entries associated with respective store instructions that are being executed, wherein an entry of the store queue includes a tag that is determined based on a virtual address of a target of the associated store instruction; and store-to-load forwarding circuitry that is configured to: compare a first virtual address of a target of a first load instruction being executed by the load unit to respective tags of one or more entries in the store queue; select an entry of the store queue based on a match between the first virtual address and the tag of the selected entry; and forward data of the selected entry in the store queue to be returned by the first load instruction.

16 Claims, 8 Drawing Sheets

Related U.S. Application Data

(60) Provisional application No. 63/292,396, filed on Dec. 21, 2021.

(58) Field of Classification Search
CPC . G06F 9/3834; G06F 12/1018; G06F 12/1475
See application file for complete search history.

(56) References Cited

U.S. PATENT DOCUMENTS

| | | |
|---|---|---|
| 11,989,286 B2* | 5/2024 | Favor .................... G06F 21/554 |
| 2010/0049952 A1 | 2/2010 | Eddy et al. |
| 2011/0040955 A1 | 2/2011 | Hooker et al. |
| 2015/0067230 A1* | 3/2015 | Avudaiyappan ...... G06F 9/3834 |
| | | 711/3 |
| 2017/0192894 A1* | 7/2017 | Yu ........................ G06F 12/0862 |
| 2018/0046575 A1* | 2/2018 | Avudaiyappan ...... G06F 9/3824 |
| 2021/0026770 A1* | 1/2021 | Ishii ....................... G06F 9/3802 |
| 2021/0072997 A1* | 3/2021 | Kothari ................ G06F 9/3834 |
| 2021/0157590 A1 | 5/2021 | King et al. |
| 2022/0027460 A1* | 1/2022 | Favor .................... G06F 9/3838 |

OTHER PUBLICATIONS

PCT/US2022/051402, "International Search Report and Written Opinion", Mar. 27, 2023, 10 pages.

* cited by examiner

STORE-TO-LOAD FORWARDING FOR PROCESSOR PIPELINES

CROSS-REFERENCES TO RELATED APPLICATIONS

This application is a continuation of International Application No. PCT/US2022/051402, filed Nov. 30, 2022, which claims priority to U.S. Provisional Application No. 63/292,396, filed Dec. 21, 2021, the contents of which are incorporated herein by reference in their entirety.

FIELD OF TECHNOLOGY

This disclosure relates to a store-to-load forwarding for processor pipelines.

BACKGROUND

Processor pipelines fetch, decode, and execute instructions, including load instructions that read data from memory and store instructions that write data to memory. A processor pipeline may be configured to parallelize and, in some cases, reorder execution of instructions fetched from memory in a program order. There can also be long delays in executing memory operations, like stores and loads, which may access slow external memory through one or more layers of cache. Memory hazards can occur where a load reading from a memory address follows a store targeting the same address in memory in program order. The load may be ready for data before the store finishes writing to the memory the value the load should read. To avoid erroneously reading a stale value from memory and reduce delay, a processor pipeline may employ store-to-load forwarding to take data from a store queue in the pipeline where it is waiting to be written to memory and return the data as the result of an implicated load instruction.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Systems and methods are described herein that may be used to implement store-to-load forwarding for processor pipelines. Store-to-load forwarding is an important feature of high-performance processor pipelines. The condition checks for store-to-load forwarding (e.g., forward from the newest older hazard in program order if it is forward-able and byte-satisfying) can be particularly complex in out-of-order processor pipeline microarchitectures. In some implementations, a processor pipeline microarchitecture may store the physical addresses for store instructions being executed only in the miss status holding registers, rather than duplicating this information in load queue or store queue entries. However, this adds a level of indirection: load instructions in a load/store management stage comparing physical address to store queue entries must first compare physical address to miss status holding register entries, then compare that result to store queue entries.

A read after write (RAW) hazard may be detected in a store load unit of a processor pipeline based on comparison of a virtual address of a load instruction to virtual address-based tags for entries in a store queue to detect these hazards a cycle before the physical address of the load instruction is determined by a translation lookaside buffer. For example, the tags in the store queue may be determined as a function (e.g., a hash) of a target address of the corresponding store instruction. In some implementations, these tags may be small and may also be stored in miss status holding registers for the store instructions to enable correlation of store queue entries with miss status holding registers. The presence of a RAW hazard may be confirmed later using physical addresses for store instructions that are stored in miss status holding registers.

Identifying these RAW hazards a cycle earlier may enable parallelizing of portions of the conditions checks for store-to-load forwarding using a circuit area and power efficient microarchitecture. Some implementations may provide advantages over conventional systems for store-to-load forwarding in a processor pipeline, such as, for example, decreasing the delay for some load instructions, reducing the circuit area of a microarchitecture for a processor pipeline, and/or decreasing power consumption of a processor pipeline in some conditions.

As used herein, the term "circuitry" refers to an arrangement of electronic components (e.g., transistors, resistors, capacitors, and/or inductors) that is structured to implement one or more functions. For example, a circuit may include one or more transistors interconnected to form logic gates that collectively implement a logical function.

Figure 1:
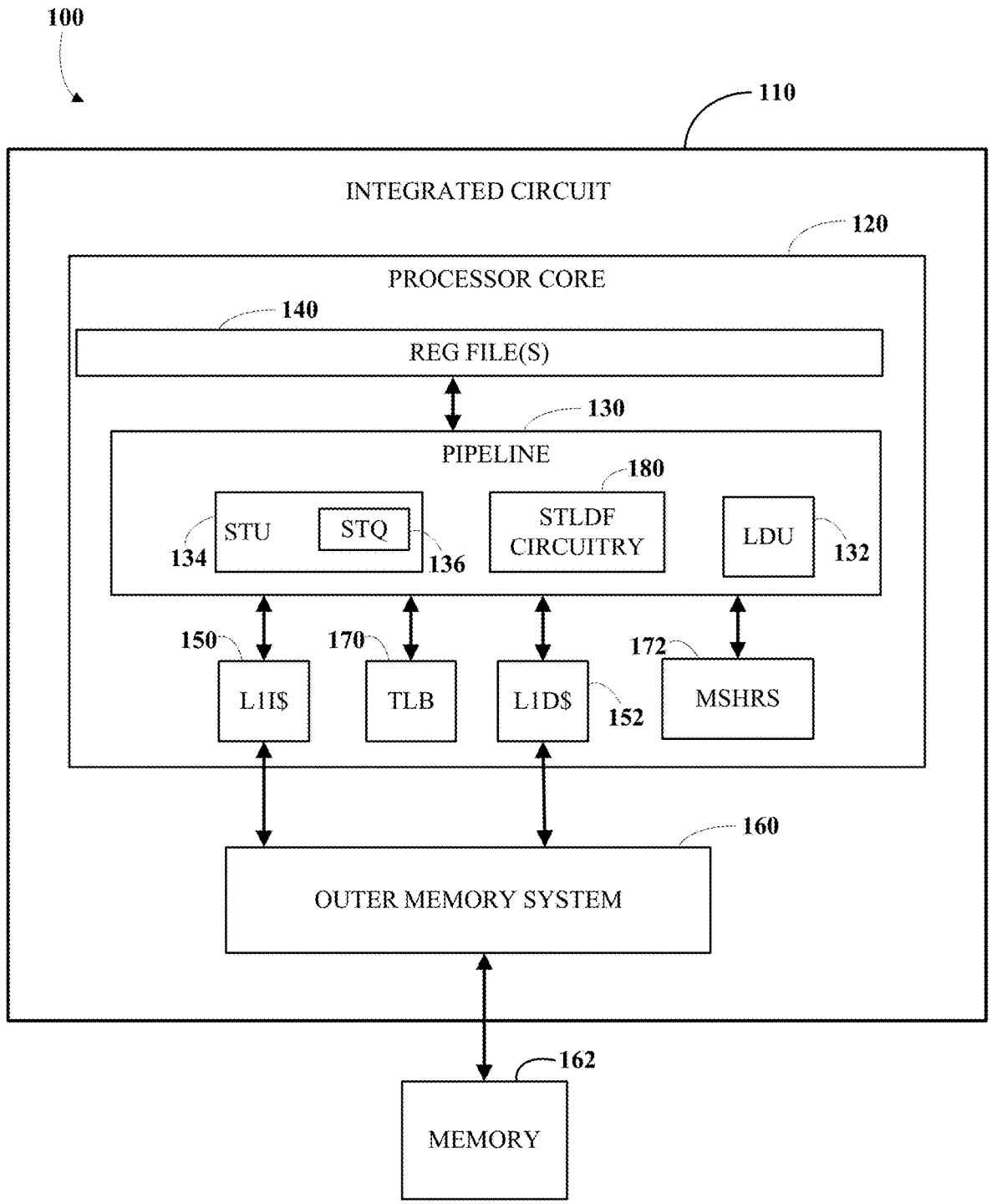
FIG. 1 is a block diagram of an example of a system for executing instructions, including store-to-load forwarding circuitry.

FIG. 1 is a block diagram of an example of a system 100 for executing instructions, including store-to-load forwarding circuitry. The system includes an integrated circuit 110 for executing instructions. The integrated circuit 110 includes a processor core 120. The processor core 120 includes a processor pipeline 130 that includes a load unit 132 for executing load instructions and a store unit 134 for executing store instructions. The store unit 134 includes a store queue 136 that has entries associated with respective store instructions that are being executed by the store unit 134. The processor core 120 includes one or more register files 140. The processor core 120 includes an L1 instruction cache 150 and an L1 data cache 152. The integrated circuit 110 includes an outer memory system 160, which may include memory storing instructions and data and/or provide access to a memory 162 external to the integrated circuit that stores instructions and/or data. The processor core 120 includes a translation lookaside buffer 170, which may be configured to translate virtual addresses to physical addresses, and a set of miss status holding registers 172. The integrated circuit 110 includes a store-to-load forwarding circuitry 180. The store-to-load forwarding circuitry 180 may be configured to perform hazard checks based on a virtual address of a target of a load instruction before the virtual address has been translated to a physical address by the translation lookaside buffer 170 to enable the start of prioritization logic earlier in the processor pipeline 130. The store-to-load forwarding circuitry 180 may leverage logic associated with the set of miss status holding registers 172 to check additional conditions for store-to-load forwarding. Entries of the store queue 136 and/or the set of miss status holding registers 172 may include tags based on virtual addresses of targets of respective store instructions to facilitate hazard detection using the virtual address. The integrated circuit 110 may provide advantages over conventional processor architectures, such as, for example, reducing delay associated with store-to-load forwarding while keeping area of the microarchitecture low, and/or conservation of power consumption. For example, the integrated circuit 110 may implement the process 500 of FIG. 5. For example, the integrated circuit 110 may implement the process 600 of FIG. 6.

The integrated circuit 110 includes a processor core 120 including a processor pipeline 130 configured to execute instructions. The processor pipeline 130 may include one or more fetch stages that are configured to retrieve instructions from a memory system of the integrated circuit 110. For example, the pipeline 130 may fetch instructions via the L1 instruction cache 150. The processor pipeline 130 includes a load unit 132 for executing load instructions and a store unit 134 for executing store instructions. The load unit 132 and the store unit 134 may access the outer memory system 160 via the L1 data cache 152 and utilize the translation lookaside buffer 170 and the set of miss status holding registers 172 to facilitate memory accesses. The processor pipeline 130 may include additional stages, such as decode, rename, dispatch, issue, execute, and write-back stages. For example, the processor core 120 may include a processor pipeline 130 configured to execute instructions of a RISC V instruction set. In some implementations, the load unit 132 and the store unit 134 may be integrated in a load/store unit of the processor pipeline 130.

The integrated circuit 110 includes a store queue 136 that has entries associated with respective store instructions that are being executed by the store unit 134. An entry of the store queue 136 may include a tag that is determined based on a virtual address of a target of the associated store instruction (e.g., a write address) and data to be written to memory. In some implementations, the tag of an entry in the store queue 136 is the virtual address of the target of the store instruction associated with the entry of the store queue 136. In some implementations, the tag of an entry in the store queue 136 is a subset of bits of the virtual address of the target of the store instruction associated with the entry of the store queue 136. In some implementations, the tag of an entry in the store queue 136 is a hash of the virtual address of the target of the store instruction associated with the selected entry of the store queue. For example, the hash may be an exclusive OR of bits of the virtual address into N bits (e.g., N equal to 2, 4, or 5 bits).

The integrated circuit 110 includes one or more register files 140, which may include a program counter for the processor core 120. For example, the register files 140 may include registers of an instruction set architecture implemented by the processor core 120.

The integrated circuit 110 includes an L1 instruction cache 150 for the processor core 120. The L1 instruction cache 150 may be a set-associative cache for instruction memory. To avoid the long latency of reading a tag array and a data array in series, and the high power of reading the arrays in parallel, a way predictor may be used. The way predictor may be accessed in an early fetch stage and the hit way may be encoded into the read index of the data array. The tag array may be accessed in later fetch stage and may be used for verifying the way predictor.

The integrated circuit 110 includes an L1 data cache 152 for the processor core 120. For example, the L1 data cache 152 may be a set-associative virtually indexed, physically tagged (VIPT) cache, meaning that it is indexed purely with virtual address bits VA[set] and tagged fully with translated physical address bits PA[msb: 12]. For low power consumption, the tag and data arrays may be looked up in serial so that at most a single data SRAM way is accessed. For example, the line size of the L1 data cache 152 may be 64 Bytes, and the beat size may be 16 Bytes. In some implementations, the L1 data cache 152 may be a physically indexed, physically tagged (PIPT) cache.

The integrated circuit 110 includes an outer memory system 160, which may include memory storing instructions and data and/or provide access to a memory 162 external to the integrated circuit 110 that stores instructions and/or data. For example, the outer memory system 160 may include an L2 cache, which may be configured to implement a cache coherency protocol/policy to maintain cache coherency across multiple L1 caches. Although not shown in FIG. 1, the integrated circuit 110 may include multiple processor cores in some implementations. For example, the outer memory system 160 may include multiple layers.

The integrated circuit 110 includes a set of miss status holding registers 172. A miss status holding register in the set of miss status holding registers 172 may include the tag in an entry of the store queue 136 and a physical address of the target of the associated store instruction. The tag may be used to correlate a miss status holding register in the set of miss status holding registers 172 to an entry in the store queue 136. In some implementations, data stored in the set of miss status holding registers 172 reflects the result of logic checking properties of a store instruction, such as forward-ability, atomic, and/or byte alignment.

The integrated circuit 110 includes a translation lookaside buffer 170 configured to translate virtual addresses to physical addresses. A virtual address may be compared to tags of one or more entries in the store queue 136 before a first physical address is determined based on the first virtual address using the translation lookaside buffer 170. For example, the translation lookaside buffer 170 may be implemented using content-addressable memory (CAM), where the CAM search key is a virtual address and the search result is a physical address. When a virtual address translation is not found in the translation lookaside buffer 170, a page table walk may be initiated to determine the physical address corresponding to a requested virtual address. For example, the translation lookaside buffer 170 may be fully associative. In some implementations, the translation lookaside buffer 170 may include multiple layers of address translation cache.

The integrated circuit 110 includes store-to-load forwarding circuitry 180. The store-to-load forwarding circuitry 180 may be configured to detect opportunities for store-to-load forwarding by detecting read after write (RAW) hazards checking other conditions for store-to-load forwarding, such as forward-ability and byte-satisfying. The store-to-load forwarding circuitry 180 may be configured to compare a first virtual address of a target of a first load instruction being executed by the load unit 132 to respective tags of one or more entries in the store queue 136, select an entry of the store queue 136 based on a match between the first virtual address and the tag of the selected entry, and forward data of the selected entry in the store queue 136 to be returned by the first load instruction. In some implementations, the tag of the selected entry is the virtual address of the target of the store instruction associated with the selected entry of the store queue 136. For example, comparing the first virtual address of the target of the first load instruction to a respective tag of an entry in the store queue 136 may include determining a bitwise exclusive OR of the first virtual address with the respective tag of the entry. In some implementations, the tag of the selected entry is a subset of bits of the virtual address of the target of the store instruction associated with the selected entry of the store queue 136. In some implementations, the tag of the selected entry is a hash of the virtual address of the target of the store instruction associated with the selected entry of the store queue 136. For example, comparing the first virtual address of the target of the first load instruction to a respective tag of an entry in the store queue 136 may include determining the hash of the first virtual address and comparing (e.g., using exclusive OR logic) the resulting hash of the first virtual address to the respective tag of the entry in the store queue 136. A match with the first virtual address may be detected if these hashes match.

The store-to-load forwarding circuitry 180 may be configured to select the entry of the store queue 136 based on a match between the first virtual address and the tag of the selected entry. In some cases, multiple entries in the store queue 136 may have tags that match the first virtual address. The selected entry may be selected as the most recent store instruction before the first load instruction in program order. In some implementations, the store-to-load forwarding circuitry 180 may be configured to select the entry of the store queue 136 by prioritizing matching entries of the store queue with tags that match the first virtual address based on program order of respective instructions associated with the matching entries to select the selected entry as corresponding to a most recent such instruction before the first load instruction. For example, the store-to-load forwarding circuitry 180 may be configured to implement the process 600 of FIG. 6. For example, the store-to-load forwarding circuitry 180 may include a priority encoder or a priority mux for selecting an entry that matches corresponding to a most recent store instruction before the first load instruction.

The store-to-load forwarding circuitry 180 may be configured to, after the first virtual address has been translated to the first physical address using the translation lookaside buffer 170, check that one or more forwarding conditions are satisfied by comparing the first physical address to a physical address in a miss status holding register in the set of miss status holding registers 172 with a tag that matches the tag of the selected entry. For example, the fact that associated store instruction has a miss status hold register may serve to confirm that the associated store instruction is forward-able and/or byte-satisfying. The store-to-load forwarding circuitry 180 may be configured to, responsive to all of the conditions being satisfied, proceed to forward data of the selected entry in the store queue to be returned by the first load instruction.

Figure 2:
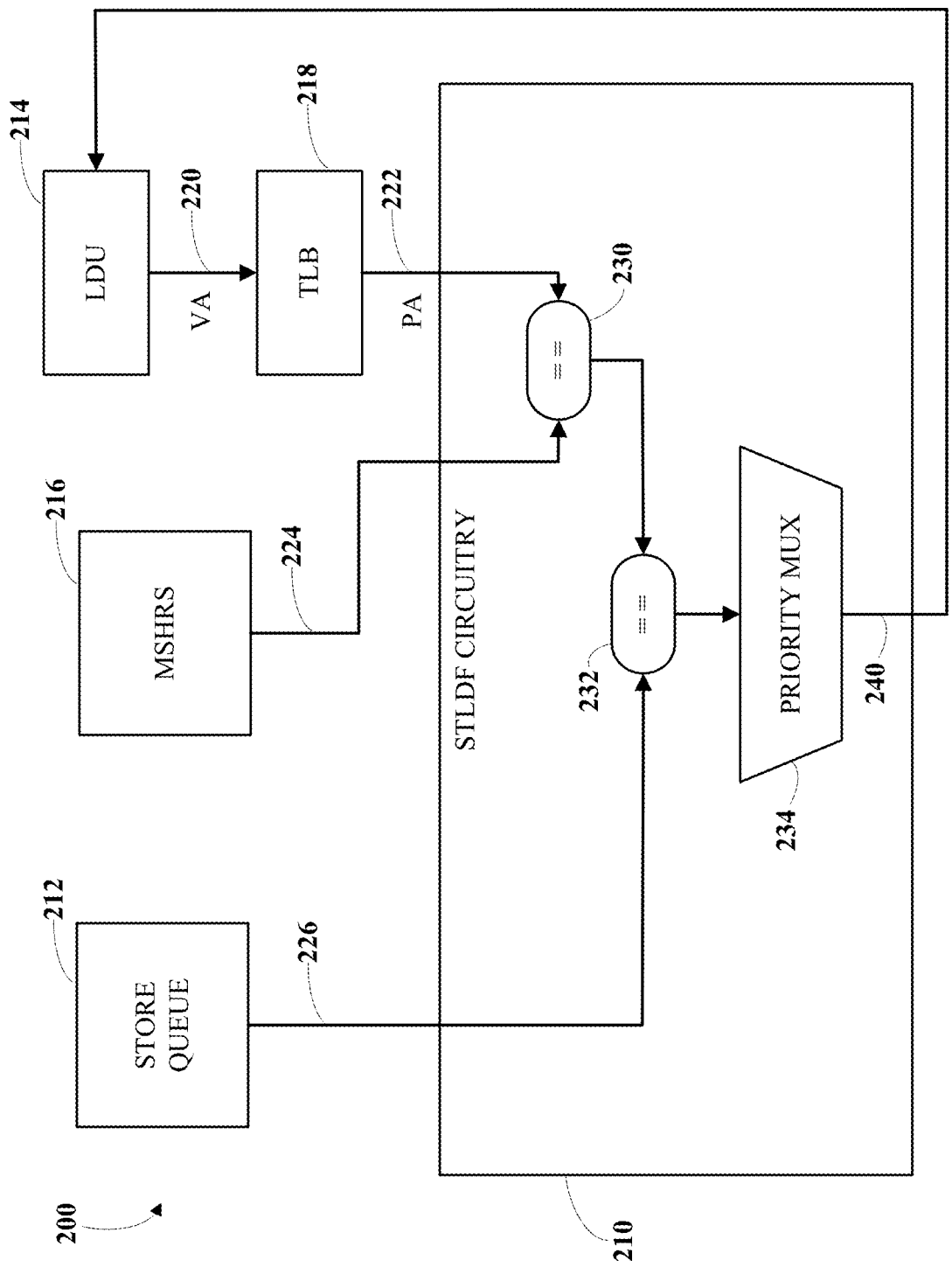
FIG. 2 is a block diagram of an example of a system for store-to-load forwarding that uses physical addresses to identify memory hazards.

FIG. 2 is a block diagram of an example of a system 200 for store-to-load forwarding that uses physical addresses to identify memory hazards. The system 200 includes a store-to-load forwarding circuitry 210, a store queue 212, a load unit 214, a set of miss status holding registers 216, and a translation lookaside buffer 218. To conserve area, it may be desirable to avoid duplicating information in multiple structures in a microarchitecture. Here, physical addresses are only stored in entries of the set of miss status holding registers 216, not in a load queue or entries of the store queue 212. However, this adds a level of indirection. Load instructions in the load unit 214 comparing physical address to entries of the store queue 212 first compare physical address to entries in the set of miss status holding registers 216, and then compare that result to entries of the store queue 212.

When a load instruction enters the load unit 214, a first virtual address 220 that is a target address (e.g., a read address) of the load instruction is input to the translation lookaside buffer 218 (e.g., a data translation lookaside buffer) to determine a first physical address 222 as the translation of the first virtual address 220. The store-to-load forwarding circuitry 210 may start processing after the first physical address 222 for the load instruction has been determined. The first physical address 222 may then be compared using comparison circuitry 230 to physical addresses 224 stored in miss status holding registers of the set of miss status holding registers 216 corresponding to outstanding store instructions. Corresponding entries 226 from the store queue 212 are then compared using the comparison circuitry 232, and a priority mux 234 is used to select an entry 240 of the store queue 212 corresponding to a newest (i.e., in program order) older RAW hazard that is forward-able and byte-satisfying. The selected entry 240 may then be forwarded to load unit 214. This is a lot of calculation to sequentially perform in one pipeline stage.

In some implementations, portions of store-to-load forwarding condition checks may be parallelized by computing as subterms: (NewestOlderFwdable VAHashMatchByteSatisfy & ~OlderVAHazardNewerThanStldf & VAPAMatchReusable). For example, some implementations may employ the following five-step technique for store-to-load forwarding:

1. Use VAHashMatch instead of PAHazard before "Find Newest Older", including to calculating the newest older Read-After-Write (RAW) StoreQ Entry regardless of STLDF.
2. Rely on Istm_mshrWaitForDependency for PA-matching VA-alias-mismatching hazards. This may require adding VAHashMatch as a criteria for reusing MSHR entries.
3. Move Reusable to after "Find Newest Older", and instead look at the StoreQ Entries for dataFwdable only from plain stores (not AMO or SC).
4. Add vAddrIdx register bits to the StoreQ Entries, instead of indirectly comparing via the MSHR Entries in Istr_mshr Vec VAddrIdxMatch.
5. Consolidate separate stldfVAddrHash and l1dcWayPredVAddrHash into just vAddrHash for area savings and one fewer parameter that we never controlled independently anyway.

Figure 3:
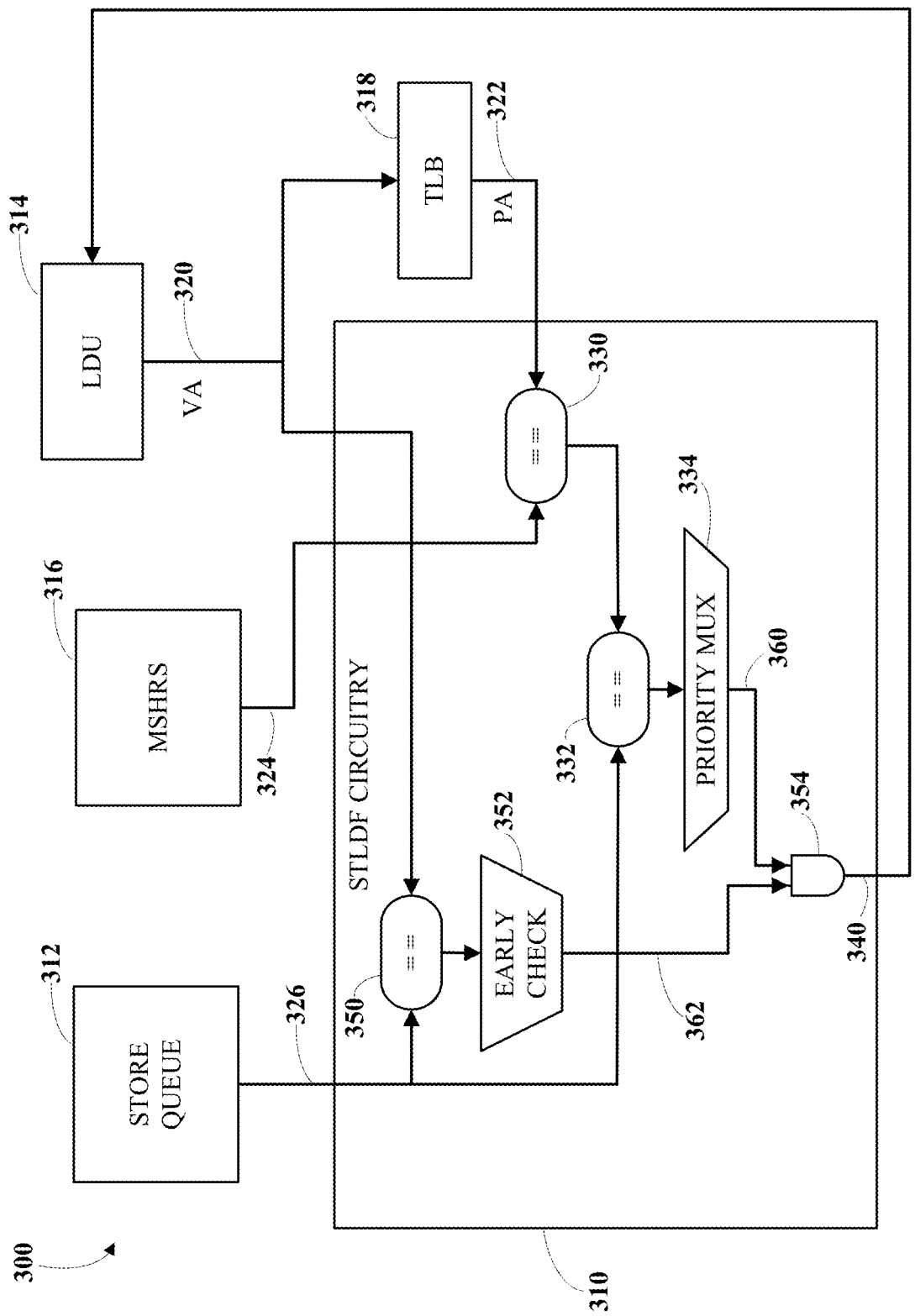
FIG. 3 is a block diagram of an example of a system for store-to-load forwarding that uses virtual addresses to identify memory hazards.

FIG. 3 is a block diagram of an example of a system 300 for store-to-load forwarding that uses virtual addresses to identify memory hazards. The system 300 includes a storeto-load forwarding circuitry 310, a store queue 312, a load unit 314, a set of miss status holding registers 316, and a translation lookaside buffer 318. When a load instruction enters the load unit 314, a first virtual address 320 that is a target address (e.g., a read address) of the load instruction is input to the translation lookaside buffer 318 (e.g., a data translation lookaside buffer) to determine a first physical address 322 as the translation of the first virtual address 320. In parallel, the first virtual address 320 may be compared using comparison circuitry 350 to virtual address information stored in entries 326 of the store queue 312 as tags. Entries 326 matching the first virtual address 320 may then be subjected to an early check 352 for conditions of store-to-load forwarding that can proceed in parallel with the address translation being performed in the translation lookaside buffer 318 for the first virtual address 320.

When the first physical address 322 is ready, the comparison circuitry 330 may be used to compare the first physical address 322 to physical addresses of entries 324 in the set of miss status holding registers 316. Corresponding entries 326 from the store queue 312 are then compared using the comparison circuitry 332, and a priority mux 334 is used to select an entry 360 of the store queue 312 corresponding to a newest (i.e., in program order) older RAW hazard. A final check may be performed with an AND gate 354 taking the selected entry 360 and corresponding result 362 of the early check 352 to determine a decision 340 to forward the selected entry 360 to the load unit 314.

Figure 4:
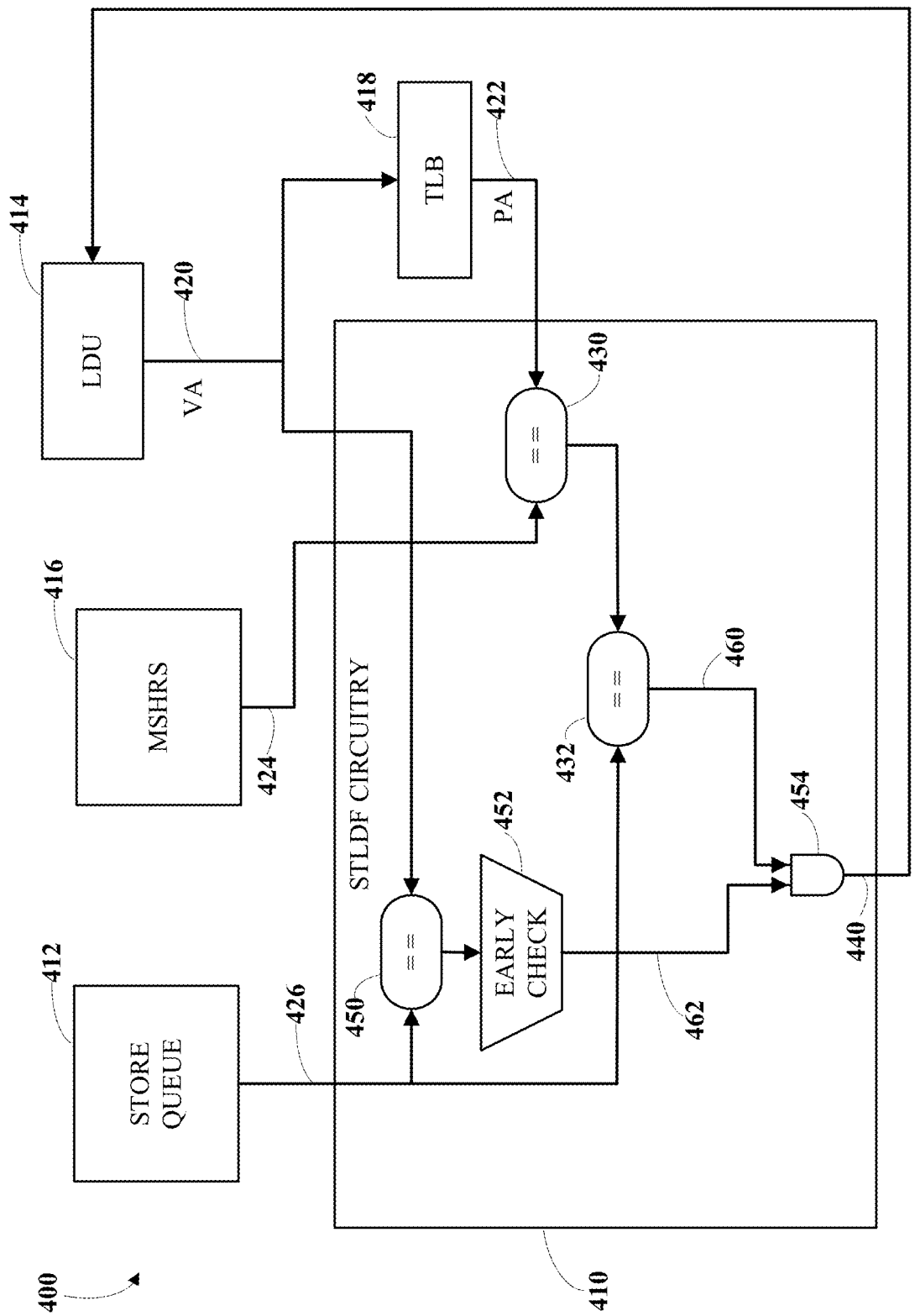
FIG. 4 is a block diagram of an example of a system for store-to-load forwarding that uses virtual addresses to identify memory hazards.

FIG. 4 is a block diagram of an example of a system 400 for store-to-load forwarding that uses virtual addresses to identify memory hazards. The system 400 includes a store-to-load forwarding circuitry 410, a store queue 412, a load unit 414, a set of miss status holding registers 416, and a translation lookaside buffer 418. When a load instruction enters the load unit 414, a first virtual address 420 that is a target address (e.g., a read address) of the load instruction is input to the translation lookaside buffer 418 (e.g., a data translation lookaside buffer) to determine a first physical address 422 as the translation of the first virtual address 420. In parallel, the first virtual address 420 may be compared using comparison circuitry 450 to virtual address information stored in entries 426 of the store queue 412 as tags. Entries 426 matching the first virtual address 420 may then be subjected to an early check 452 for conditions of store-to-load forwarding that can proceed in parallel with the address translation being performed in the translation lookaside buffer 418 for the first virtual address 420.

When the first physical address 422 is ready, the comparison circuitry 430 may be used to compare the first physical address 422 to physical addresses of entries 424 in the set of miss status holding registers 416. Corresponding entries 426 from the store queue 412 are then compared using the comparison circuitry 432. A final check may be performed with an AND gate 454 taking the selected entry 460 and a corresponding result 462 of the early check 452 to determine a decision 440 to forward the selected entry 460 to the load unit 414.

Figure 5:
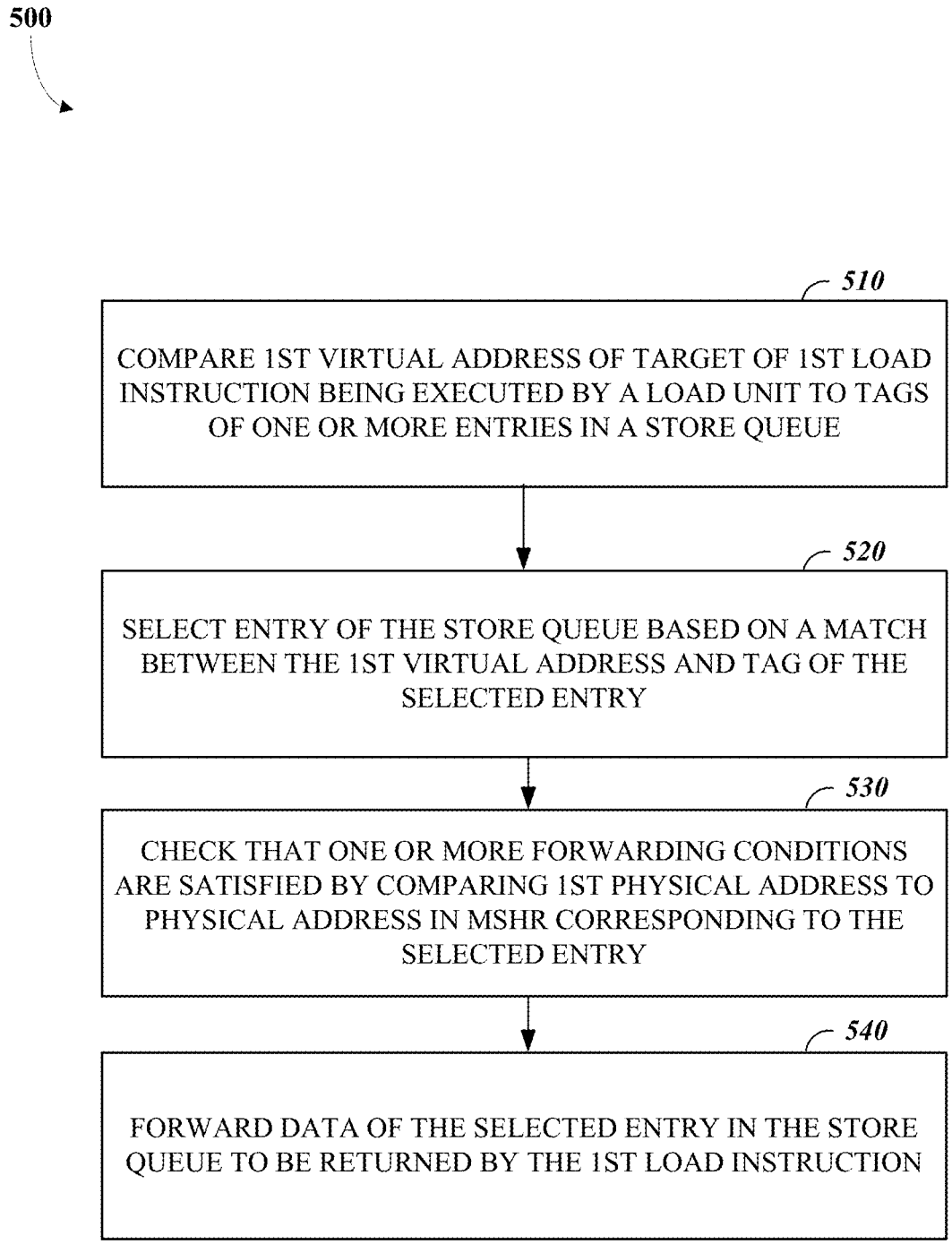
FIG. 5 is a flow chart of an example of a process for store-to-load forwarding.

FIG. 5 is a flow chart of an example of a process 500 for store-to-load forwarding. The process 500 includes comparing 510 a virtual address of a target of a load instruction being executed by a load unit to respective tags of one or more entries in a store queue; selecting 520 an entry of the store queue based on a match between the virtual address and the tag of the selected entry; checking 530 that one or more forwarding conditions are satisfied by comparing a physical address determined based on the virtual address to a physical address in a miss status holding register with a tag that matches the tag of the selected entry; and forwarding 540 data of the selected entry in the store queue to be returned by the load instruction. Some implementations may provide advantages, such as, for example, decreasing the delay for some load instructions, reducing the circuit area, and/or decreasing power consumption of a processor pipeline in some conditions. For example, the process 500 may be implemented using the system 100 of FIG. 1. For example, the process 500 may be implemented using the system 300 of FIG. 3. For example, the process 500 may be implemented using the system 400 of FIG. 4.

The process 500 includes comparing 510 a first virtual address of a target of a first load instruction being executed by a load unit to respective tags of one or more entries in a store queue (e.g., the store queue 136). An entry of the store queue may include a tag that is determined based on a virtual address of a target of an associated store instruction and data to be written to memory. In some implementations, the tag of an entry in the store queue may be the virtual address of the target of the store instruction associated with the entry. For example, comparing 510 the first virtual address of the target of the first load instruction to a respective tag of an entry in the store queue may include determining a bitwise exclusive OR of the first virtual address with the respective tag of the entry. In some implementations, the tag of an entry in the store queue may be a subset of bits of the virtual address of the target of the store instruction associated with the entry. In some implementations, the tag of an entry in the store queue is a hash of the virtual address of the target of the store instruction associated with the selected entry of the store queue. For example, the hash may be an exclusive OR of bits of the virtual address into N bits (e.g., N equal to 2, 4, or 5 bits). For example, comparing 510 the first virtual address of the target of the first load instruction to a respective tag of an entry in the store queue may include determining the hash of the first virtual address and comparing (e.g., using exclusive OR logic) the resulting hash of the first virtual address to the respective tag of the entry in the store queue. A match with the first virtual address may be detected if these hashes match.

The process 500 includes selecting 520 an entry of the store queue based on a match between the first virtual address and the tag of the selected entry. For example, the tag of the selected entry may be the virtual address of the target of the store instruction associated with the selected entry of the store queue. For example, the tag of the selected entry may be a subset of bits of the virtual address of the target of the store instruction associated with the selected entry of the store queue. For example, the tag of the selected entry may be a hash of the virtual address of the target of the store instruction associated with the selected entry of the store queue. In some cases, multiple entries in the store queue may have tags that match the first virtual address. The selected entry may be selected 520 as the most recent store instruction before the first load instruction in program order. In some implementations, selecting 520 the entry of the store queue may include prioritizing matching entries of the store queue with tags that match the first virtual address based on program order of respective instructions associated with the matching entries to select 520 the selected entry as corresponding to a most recent such instruction before the first load instruction. For example, selecting 520 an entry of the store queue based on a match may include implementing the process 600 of FIG. 6.

In some implementations, the first virtual address may be compared to tags of one or more entries in the store queue before a first physical address is determined based on the first virtual address using a translation lookaside buffer. In this example, the process 500 includes checking 530 that one or more forwarding conditions are satisfied by comparing the first physical address to a physical address in a miss status holding register with a tag that matches the tag of the selected entry. For example, the fact that associated store instruction has a miss status hold register may serve to confirm that the associated store instruction is forward-able and/or byte-satisfying.

The process 500 includes forwarding 540 data of the selected entry in the store queue to be returned by the first load instruction. For example, data of the selected entry in the store queue may be copied to a load queue entry or another microarchitectural structure associated with the first load instruction to await writeback to a destination register of the first load instruction.

Figure 6:
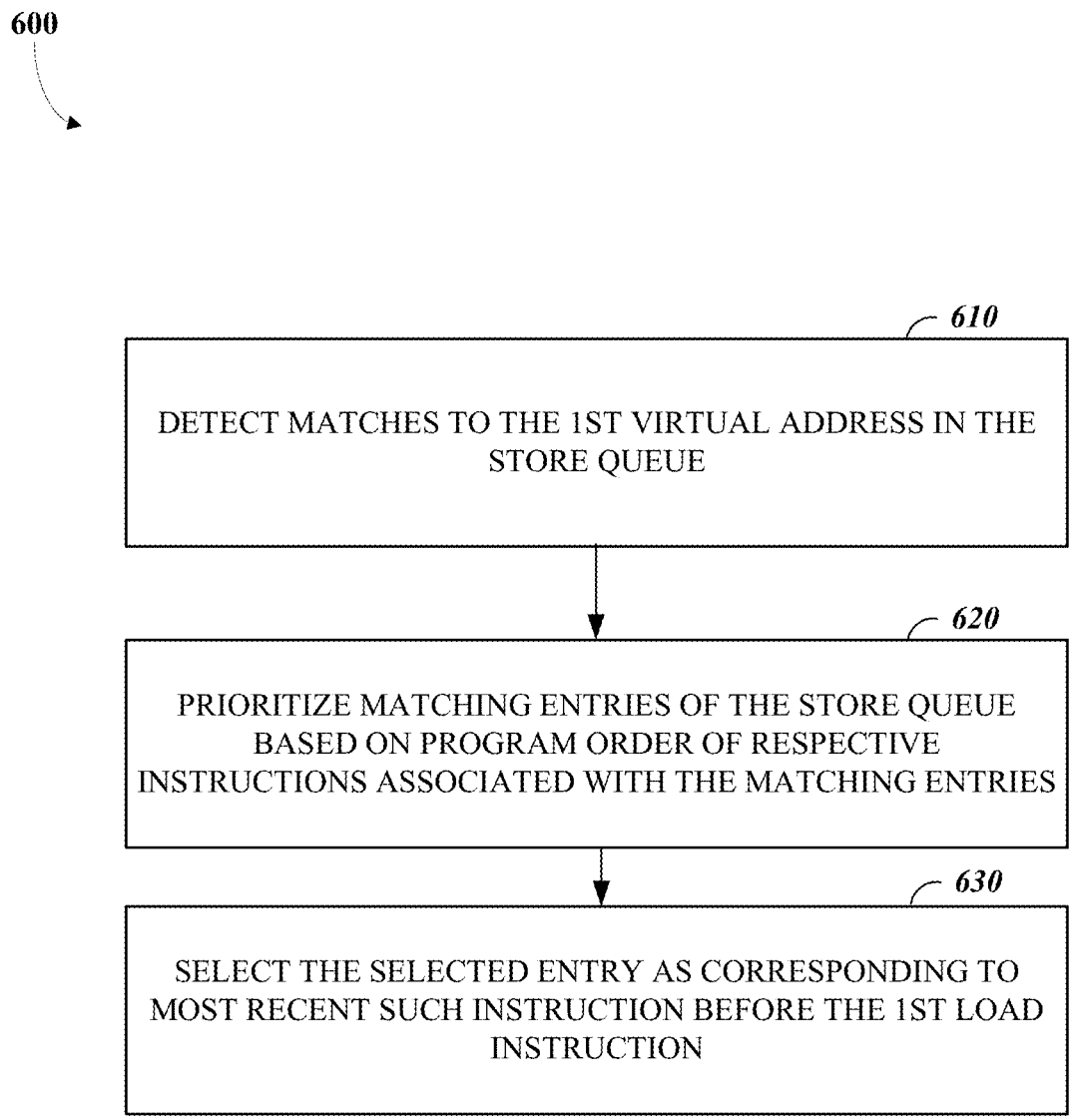
FIG. 6 is a flow chart of an example of a process for selecting an entry of a store queue based on a match between a virtual address and a tag of the selected entry.

FIG. 6 is a flow chart of an example of a process 600 for selecting an entry of a store queue based on a match between a first virtual address and a tag of the selected entry. The first virtual address is a target address (e.g., a read address) of a first load instruction. The process 600 includes detecting 610 matches to the first virtual address in the store queue; prioritizing 620 matching entries of the store queue with tags that match the first virtual address based on program order of respective instructions associated with the matching entries; and selecting 630 an entry as corresponding to a most recent such instruction before the first load instruction. For example, a priority encoder or a priority mux may be used for selecting 630 an entry that matches corresponding to a most recent store instruction before the first load instruction. For example, the process 600 may be implemented using the system 100 of FIG. 1. For example, the process 600 may be implemented using the system 300 of FIG. 3. For example, the process 600 may be implemented using the system 400 of FIG. 4.

Figure 7:
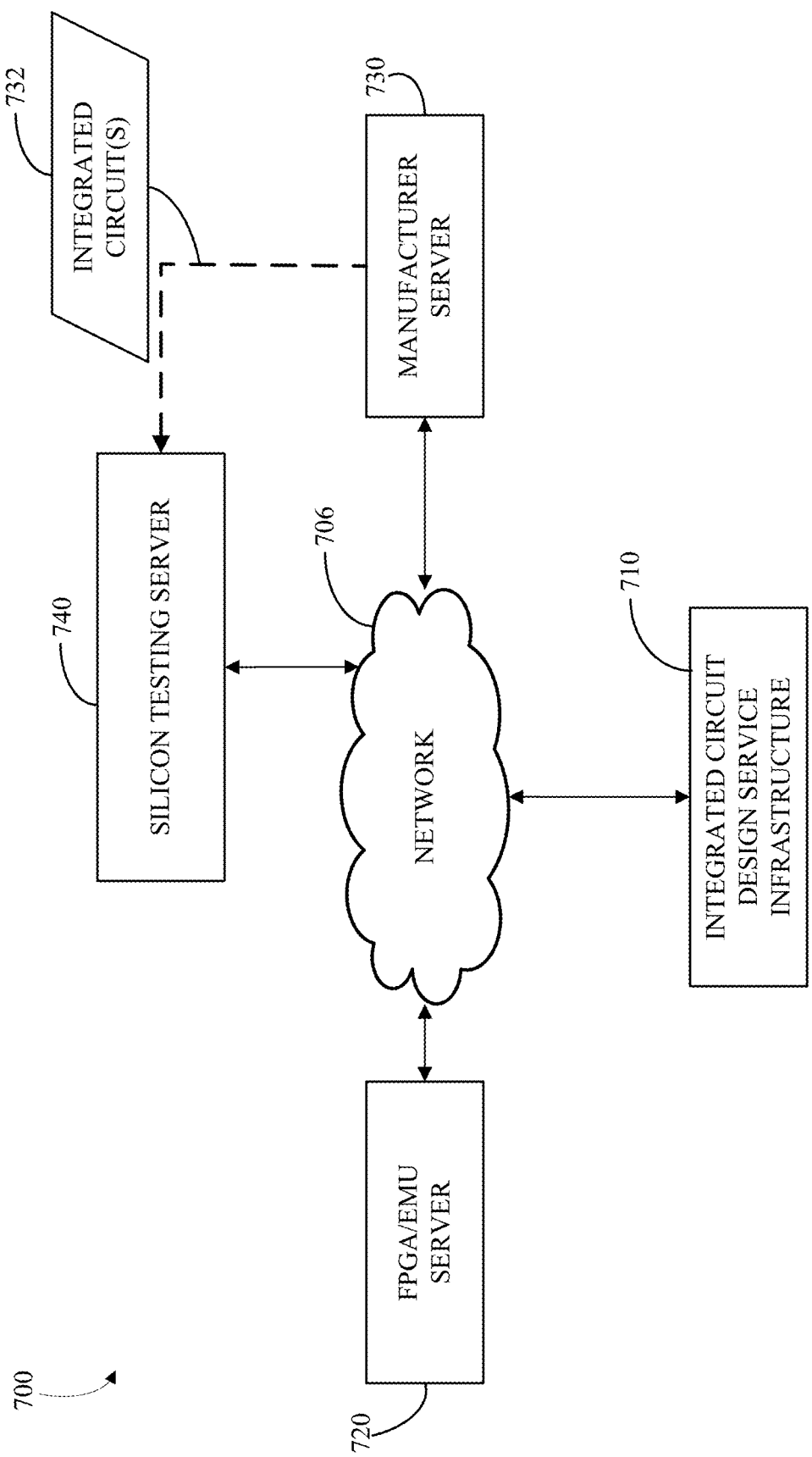
FIG. 7 is block diagram of an example of a system for facilitating generation and manufacture of integrated circuits.

FIG. 7 is block diagram of an example of a system 700 for generation and manufacture of integrated circuits. The system 700 includes a network 706, an integrated circuit design service infrastructure 710, a field programmable gate array (FPGA)/emulator server 720, and a manufacturer server 730. For example, a user may utilize a web client or a scripting API client to command the integrated circuit design service infrastructure 710 to automatically generate an integrated circuit design based a set of design parameter values selected by the user for one or more template integrated circuit designs. In some implementations, the integrated circuit design service infrastructure 710 may be configured to generate an integrated circuit design that includes the circuitry shown and described in FIGS. 1-4.

The integrated circuit design service infrastructure 710 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 710 may invoke (e.g., via network communications over the network 706) testing of the resulting design that is performed by the FPGA/emulation server 720 that is running one or more FPGAs or other types of hardware or software emulators. For example, the integrated circuit design service infrastructure 710 may invoke a test using a field programmable gate array, programmed based on a field programmable gate array emulation data structure, to obtain an emulation result. The field programmable gate array may be operating on the FPGA/emulation server 720, which may be a cloud server. Test results may be returned by the FPGA/emulation server 720 to the integrated circuit design service infrastructure 710 and relayed in a useful format to the user (e.g., via a web client or a scripting API client).

The integrated circuit design service infrastructure 710 may also facilitate the manufacture of integrated circuits using the integrated circuit design in a manufacturing facility associated with the manufacturer server 730. In some implementations, a physical design specification (e.g., a graphic data system (GDS) file, such as a GDS II file) based on a physical design data structure for the integrated circuit is transmitted to the manufacturer server 730 to invoke manufacturing of the integrated circuit (e.g., using manufacturing equipment of the associated manufacturer). For example, the manufacturer server 730 may host a foundry tape out website that is configured to receive physical design specifications (e.g., as a GDSII file or an OASIS file) to schedule or otherwise facilitate fabrication of integrated circuits. In some implementations, the integrated circuit design service infrastructure 710 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 710 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 730 may fabricate and/or test integrated circuits based on the integrated circuit design. For example, the associated manufacturer (e.g., a foundry) may perform optical proximity correction (OPC) and similar post-tapeout/pre-production processing, fabricate the integrated circuit(s) 732, update the integrated circuit design service infrastructure 710 (e.g., via communications with a controller or a web application server) periodically or asynchronously on the status of the manufacturing process, perform appropriate testing (e.g., wafer testing), and send to packaging house for packaging. A packaging house may receive the finished wafers or dice from the manufacturer and test materials and update the integrated circuit design service infrastructure 710 on the status of the packaging and delivery process periodically or asynchronously. In some implementations, status updates may be relayed to the user when the user checks in using the web interface and/or the controller might email the user that updates are available.

In some implementations, the resulting integrated circuits 732 (e.g., physical chips) are delivered (e.g., via mail) to a silicon testing service provider associated with a silicon testing server 740. In some implementations, the resulting integrated circuits 732 (e.g., physical chips) are installed in a system controlled by silicon testing server 740 (e.g., a cloud server) making them quickly accessible to be run and tested remotely using network communications to control the operation of the integrated circuits 732. For example, a login to the silicon testing server 740 controlling a manufactured integrated circuits 732 may be sent to the integrated circuit design service infrastructure 710 and relayed to a user (e.g., via a web client). For example, the integrated circuit design service infrastructure 710 may control testing of one or more integrated circuits 732, which may be structured based on an RTL data structure.

Figure 8:
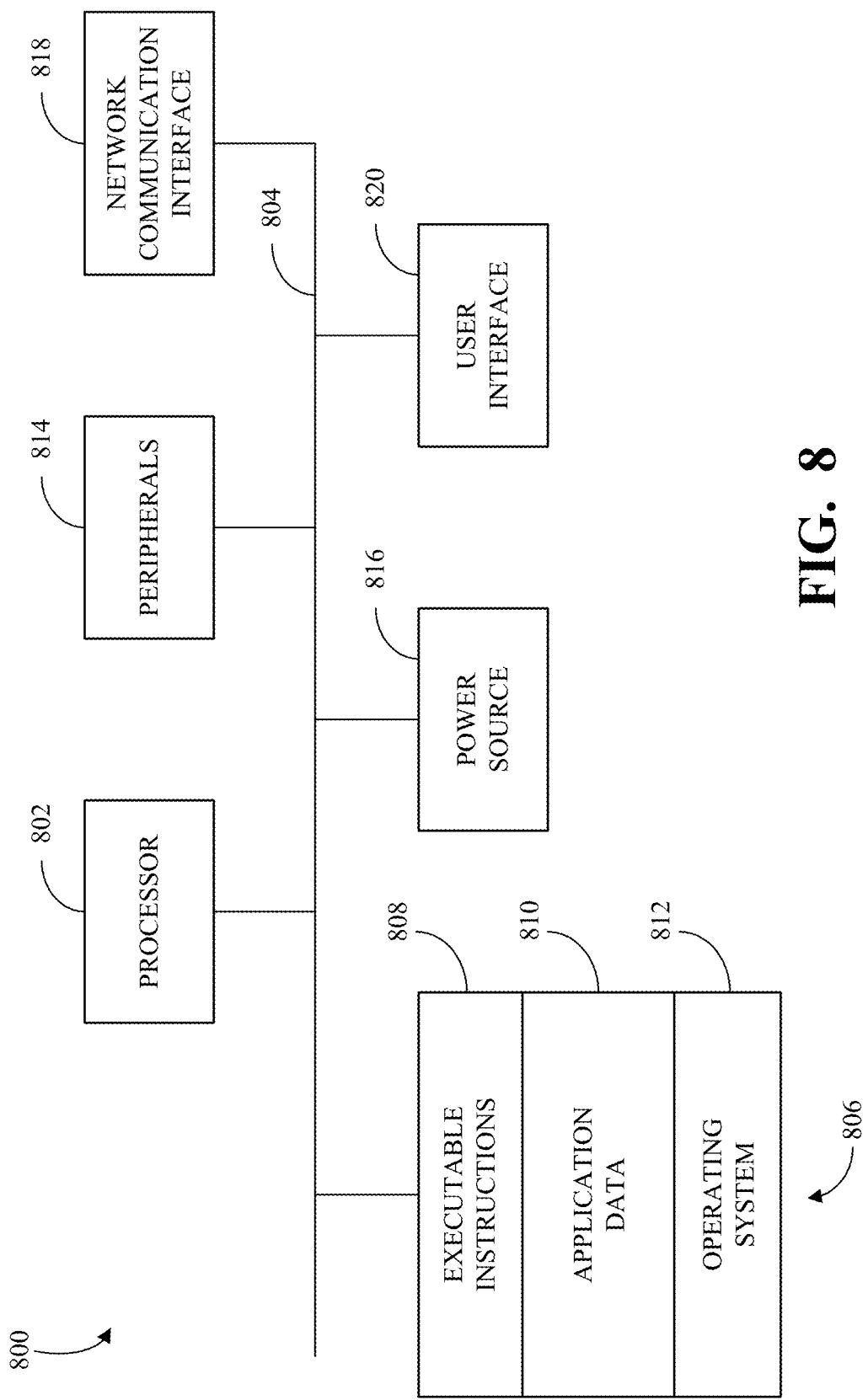
FIG. 8 is block diagram of an example of a system for facilitating generation of integrated circuits.

FIG. 8 is block diagram of an example of a system 800 for facilitating generation of integrated circuits, for facilitating generation of a circuit representation for an integrated circuit, and/or for programming or manufacturing an integrated circuit. The system 800 is an example of an internal configuration of a computing device. The system 800 may be used to implement the integrated circuit design service infrastructure 710, and/or to generate a file that generates a circuit representation of an integrated circuit design including the circuitry shown and described in FIGS. 1-4. The system 800 can include components or units, such as a processor 802, a bus 804, a memory 806, peripherals 814, a power source 816, a network communication interface 818, a user interface 820, other suitable components, or a combination thereof.

The processor 802 can be a central processing unit (CPU), such as a microprocessor, and can include single or multiple processors having single or multiple processing cores. Alternatively, the processor 802 can include another type of device, or multiple devices, now existing or hereafter developed, capable of manipulating or processing information. For example, the processor 802 can include multiple processors interconnected in any manner, including hardwired or networked, including wirelessly networked. In some implementations, the operations of the processor 802 can be distributed across multiple physical devices or units that can be coupled directly or across a local area or other suitable type of network. In some implementations, the processor 802 can include a cache, or cache memory, for local storage of operating data or instructions.

The memory 806 can include volatile memory, non-volatile memory, or a combination thereof. For example, the memory 806 can include volatile memory, such as one or more DRAM modules such as double data rate (DDR) synchronous dynamic random access memory (SDRAM), and non-volatile memory, such as a disk drive, a solid state drive, flash memory, Phase-Change Memory (PCM), or any form of non-volatile memory capable of persistent electronic information storage, such as in the absence of an active power supply. The memory 806 can include another type of device, or multiple devices, now existing or hereafter developed, capable of storing data or instructions for processing by the processor 802. The processor 802 can access or manipulate data in the memory 806 via the bus 804. Although shown as a single block in FIG. 8, the memory 806 can be implemented as multiple units. For example, a system 800 can include volatile memory, such as RAM, and persistent memory, such as a hard drive or other storage.

The memory 806 can include executable instructions 808, data, such as application data 810, an operating system 812, or a combination thereof, for immediate access by the processor 802. The executable instructions 808 can include, for example, one or more application programs, which can be loaded or copied, in whole or in part, from non-volatile memory to volatile memory to be executed by the processor 802. The executable instructions 808 can be organized into programmable modules or algorithms, functional programs, codes, code segments, or combinations thereof to perform various functions described herein. For example, the executable instructions 808 can include instructions executable by the processor 802 to cause the system 800 to automatically, in response to a command, generate an integrated circuit design and associated test results based on a design parameters data structure. The application data 810 can include, for example, user files, database catalogs or dictionaries, configuration information or functional programs, such as a web browser, a web server, a database server, or a combination thereof. The operating system 812 can be, for example, Microsoft Windows®, macOS®, or Linux®; an operating system for a small device, such as a smartphone or tablet device; or an operating system for a large device, such as a mainframe computer. The memory 806 can comprise one or more devices and can utilize one or more types of storage, such as solid state or magnetic storage.

The peripherals 814 can be coupled to the processor 802 via the bus 804. The peripherals 814 can be sensors or detectors, or devices containing any number of sensors or detectors, which can monitor the system 800 itself or the environment around the system 800. For example, a system 800 can contain a temperature sensor for measuring temperatures of components of the system 800, such as the processor 802. Other sensors or detectors can be used with the system 800, as can be contemplated. In some implementations, the power source 816 can be a battery, and the system 800 can operate independently of an external power distribution system. Any of the components of the system 800, such as the peripherals 814 or the power source 816, can communicate with the processor 802 via the bus 804.

The network communication interface 818 can also be coupled to the processor 802 via the bus 804. In some implementations, the network communication interface 818 can comprise one or more transceivers. The network communication interface 818 can, for example, provide a connection or link to a network, such as the network 706 shown in FIG. 7, via a network interface, which can be a wired network interface, such as Ethernet, or a wireless network interface. For example, the system 800 can communicate with other devices via the network communication interface 818 and the network interface using one or more network protocols, such as Ethernet, transmission control protocol (TCP), Internet protocol (IP), power line communication (PLC), wireless fidelity (Wi-Fi), infrared, general packet radio service (GPRS), global system for mobile communications (GSM), code division multiple access (CDMA), or other suitable protocols.

A user interface 820 can include a display; a positional input device, such as a mouse, touchpad, touchscreen, or the like; a keyboard; or other suitable human or machine interface devices. The user interface 820 can be coupled to the processor 802 via the bus 804. Other interface devices that permit a user to program or otherwise use the system 800 can be provided in addition to or as an alternative to a display. In some implementations, the user interface 820 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 814. The operations of the processor 802 can be distributed across multiple clients or servers, which can be coupled directly or across a local area or other suitable type of network. The memory 806 can be distributed across multiple clients or servers, such as network-based memory or memory in multiple clients or servers performing the operations of clients or servers. Although depicted here as a single bus, the bus 804 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

In a first aspect, the subject matter described in this specification can be embodied in an integrated circuit for executing instructions that includes a processor pipeline including a load unit for executing load instructions and a store unit for executing store instructions; a store queue that has entries associated with respective store instructions that are being executed by the store unit, wherein an entry of the store queue includes a tag that is determined based on a virtual address of a target of the associated store instruction and data to be written to memory; and store-to-load forwarding circuitry that is configured to: compare a first virtual address of a target of a first load instruction being executed by the load unit to respective tags of one or more entries in the store queue; select an entry of the store queue based on a match between the first virtual address and the tag of the selected entry; and forward data of the selected entry in the store queue to be returned by the first load instruction.

In the first aspect, the integrated circuit may include a translation lookaside buffer configured to translate virtual addresses to physical addresses, wherein the first virtual address is compared to tags of one or more entries in the store queue before a first physical address is determined based on the first virtual address using the translation lookaside buffer. In the first aspect, the integrated circuit may include a set of miss status holding registers, wherein a miss status holding register in the set of miss status holding registers includes the tag in an entry of the store queue and a physical address of the target of the associated store instruction. In the first aspect, the store-to-load forwarding circuitry may be configured to check that one or more forwarding conditions are satisfied by comparing the first physical address to a physical address in a miss status holding register in the set of miss status holding registers with a tag that matches the tag of the selected entry. In the first aspect, the tag of the selected entry may be the virtual address of the target of the store instruction associated with the selected entry of the store queue. In the first aspect, the tag of the selected entry may be a subset of bits of the virtual address of the target of the store instruction associated with the selected entry of the store queue. In the first aspect, the tag of the selected entry may be a hash of the virtual address of the target of the store instruction associated with the selected entry of the store queue. In the first aspect, the store-to-load forwarding circuitry may be configured to prioritize matching entries of the store queue with tags that match the first virtual address based on program order of respective instructions associated with the matching entries to select the selected entry as corresponding to a most recent such instruction before the first load instruction. In the first aspect, the load unit and the store unit may be integrated in a load/store unit of the processor pipeline.

In a second aspect, the subject matter described in this specification can be embodied in methods that include comparing a first virtual address of a target of a first load instruction being executed by a load unit to respective tags of one or more entries in a store queue, wherein an entry of the store queue includes a tag that is determined based on a virtual address of a target of an associated store instruction and data to be written to memory; selecting an entry of the store queue based on a match between the first virtual address and the tag of the selected entry; and forwarding data of the selected entry in the store queue to be returned by the first load instruction.

In the second aspect, the first virtual address may be compared to tags of one or more entries in the store queue before a first physical address is determined based on the first virtual address using a translation lookaside buffer. In the second aspect, the methods may include checking that one or more forwarding conditions are satisfied by comparing the first physical address to a physical address in a miss status holding register with a tag that matches the tag of the selected entry. In the second aspect, the tag of the selected entry is the virtual address of the target of the store instruction associated with the selected entry of the store queue. In the second aspect, the tag of the selected entry may be a subset of bits of the virtual address of the target of the store instruction associated with the selected entry of the store queue. In the second aspect, the tag of the selected entry may be a hash of the virtual address of the target of the store instruction associated with the selected entry of the store queue. In the second aspect, selecting the entry of the store queue may include prioritizing matching entries of the store queue with tags that match the first virtual address based on program order of respective instructions associated with the matching entries to select the selected entry as corresponding to a most recent such instruction before the first load instruction.

In a third aspect, the subject matter described in this specification can be embodied in an integrated circuit for executing instructions that includes a processor pipeline including a load unit for executing load instructions and a store unit for executing store instructions; a store queue that has entries associated with respective store instructions that are being executed by the store unit, wherein an entry of the store queue includes a tag that is determined based on a virtual address of a target of the associated store instruction and data to be written to memory; a set of miss status holding registers, wherein a miss status holding register in the set of miss status holding registers includes the tag in an entry of the store queue and a physical address of the target of the associated store instruction; and store-to-load forwarding circuitry that is configured to: compare a first virtual address of a target of a first load instruction being executed by the load unit to respective tags of one or more entries in the store queue; select an entry of the store queue based on a match between the first virtual address and the tag of the selected entry; and forward data of the selected entry in the store queue to be returned by the first load instruction.

In the third aspect, the integrated circuit may include a translation lookaside buffer configured to translate virtual addresses to physical addresses, wherein the first virtual address is compared to tags of one or more entries in the store queue before a first physical address is determined based on the first virtual address using the translation lookaside buffer. In the third aspect, the store-to-load forwarding circuitry may be configured to check that one or more forwarding conditions are satisfied by comparing the first physical address to a physical address in a miss status holding register in the set of miss status holding registers with a tag that matches the tag of the selected entry. In the third aspect, the tag of the selected entry may be the virtual address of the target of the store instruction associated with the selected entry of the store queue. In the third aspect, the tag of the selected entry may be a subset of bits of the virtual address of the target of the store instruction associated with the selected entry of the store queue. In the third aspect, the tag of the selected entry may be a hash of the virtual address of the target of the store instruction associated with the selected entry of the store queue. In the third aspect, the store-to-load forwarding circuitry may be configured to prioritize matching entries of the store queue with tags that match the first virtual address based on program order of respective instructions associated with the matching entries to select the selected entry as corresponding to a most recent such instruction before the first load instruction. In the third aspect, the load unit and the store unit may be integrated in a load/store unit of the processor pipeline.

In a fourth aspect, the subject matter described in this specification can be embodied in a non-transitory computer readable medium comprising a circuit representation that, when processed by a computer, is used to program or manufacture an integrated circuit that includes a processor pipeline including a load unit for executing load instructions and a store unit for executing store instructions; a store queue that has entries associated with respective store instructions that are being executed by the store unit, wherein an entry of the store queue includes a tag that is determined based on a virtual address of a target of the associated store instruction and data to be written to memory; and store-to-load forwarding circuitry that is configured to: compare a first virtual address of a target of a first load instruction being executed by the load unit to respective tags of one or more entries in the store queue; select an entry of the store queue based on a match between the first virtual address and the tag of the selected entry; and forward data of the selected entry in the store queue to be returned by the first load instruction.

In the fourth aspect, the integrated circuit may include a translation lookaside buffer configured to translate virtual addresses to physical addresses, wherein the first virtual address is compared to tags of one or more entries in the store queue before a first physical address is determined based on the first virtual address using the translation lookaside buffer. In the fourth aspect, the integrated circuit may include a set of miss status holding registers, wherein a miss status holding register in the set of miss status holding registers includes the tag in an entry of the store queue and a physical address of the target of the associated store instruction. In the fourth aspect, the store-to-load forwarding circuitry may be configured to check that one or more forwarding conditions are satisfied by comparing the first physical address to a physical address in a miss status holding register in the set of miss status holding registers with a tag that matches the tag of the selected entry. In the fourth aspect, the tag of the selected entry may be the virtual address of the target of the store instruction associated with the selected entry of the store queue. In the fourth aspect, the tag of the selected entry may be a subset of bits of the virtual address of the target of the store instruction associated with the selected entry of the store queue. In the fourth aspect, the tag of the selected entry may be a hash of the virtual address of the target of the store instruction associated with the selected entry of the store queue. In the fourth aspect, the store-to-load forwarding circuitry may be configured to prioritize matching entries of the store queue with tags that match the first virtual address based on program order of respective instructions associated with the matching entries to select the selected entry as corresponding to a most recent such instruction before the first load instruction. In the fourth aspect, the load unit and the store unit may be integrated in a load/store unit of the processor pipeline.

In a fifth aspect, the subject matter described in this specification can be embodied in a non-transitory computer readable medium comprising a circuit representation that, when processed by a computer, is used to program or manufacture an integrated circuit that includes a processor pipeline including a load unit for executing load instructions and a store unit for executing store instructions; a store queue that has entries associated with respective store instructions that are being executed by the store unit, wherein an entry of the store queue includes a tag that is determined based on a virtual address of a target of the associated store instruction and data to be written to memory; a set of miss status holding registers, wherein a miss status holding register in the set of miss status holding registers includes the tag in an entry of the store queue and a physical address of the target of the associated store instruction; and store-to-load forwarding circuitry that is configured to: compare a first virtual address of a target of a first load instruction being executed by the load unit to respective tags of one or more entries in the store queue; select an entry of the store queue based on a match between the first virtual address and the tag of the selected entry; and forward data of the selected entry in the store queue to be returned by the first load instruction.

In the fifth aspect, the integrated circuit may include a translation lookaside buffer configured to translate virtual addresses to physical addresses, wherein the first virtual address is compared to tags of one or more entries in the store queue before a first physical address is determined based on the first virtual address using the translation lookaside buffer. In the fifth aspect, the store-to-load forwarding circuitry may be configured to check that one or more forwarding conditions are satisfied by comparing the first physical address to a physical address in a miss status holding register in the set of miss status holding registers with a tag that matches the tag of the selected entry. In the fifth aspect, the tag of the selected entry may be the virtual address of the target of the store instruction associated with the selected entry of the store queue. In the fifth aspect, the tag of the selected entry may be a subset of bits of the virtual address of the target of the store instruction associated with the selected entry of the store queue. In the fifth aspect, the tag of the selected entry may be a hash of the virtual address of the target of the store instruction associated with the selected entry of the store queue. In the fifth aspect, the store-to-load forwarding circuitry may be configured to prioritize matching entries of the store queue with tags that match the first virtual address based on program order of respective instructions associated with the matching entries to select the selected entry as corresponding to a most recent such instruction before the first load instruction. In the fifth aspect, the load unit and the store unit may be integrated in a load/store unit of the processor pipeline.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. A method comprising:
   determining a match between a first virtual address of a first load instruction being executed by a load unit and a tag of an entry in a store queue, wherein the entry includes the tag that is determined by a function that combines a plurality of bits of a virtual address of a store instruction to generate a new value, wherein the tag is separate from the virtual address;
   selecting the entry based on the match; and
   forwarding data of the entry in the store queue to be returned by the first load instruction.

2. The method of claim 1, wherein the first virtual address is compared to tags of entries in the store queue before a first physical address is determined based on the first virtual address using a translation lookaside buffer.

3. The method of claim 2, further comprising:
   checking that one or more forwarding conditions are satisfied by comparing the first physical address to a physical address in a miss status holding register with a tag that matches the tag of the entry.

4. The method of claim 1, wherein the function is a hash function such that the tag of the entry is a hash of the virtual address of the store instruction.

5. The method of claim 1, wherein selecting the entry comprises:
   prioritizing matching entries of the store queue with tags that match the first virtual address based on program order of respective instructions associated with the matching entries to select the selected entry as corresponding to a most recent instruction before the first load instruction.

6. An integrated circuit comprising:
   a processor pipeline including a load unit for executing load instructions and a store unit for executing store instructions;
   a store queue that has entries associated with respective store instructions that are being executed by the store unit, wherein an entry of the entries includes a tag that is determined by a function that combines a plurality of bits of a virtual address of a store instruction to generate a new value, wherein the tag is separate from the virtual address; and
   store-to-load forwarding circuitry that is configured to:
      determine a match between a first virtual address of a first load instruction being executed by the load unit and the tag of the entry;
      select the entry of the store queue based on the match; and
      forward, based on the entry being selected, data of the entry in the store queue to be returned by the first load instruction.

7. The integrated circuit of claim 6, further comprising:
   a translation lookaside buffer configured to translate virtual addresses to physical addresses, wherein the first virtual address is compared to tags of the entries before a first physical address is determined based on the first virtual address using the translation lookaside buffer.

8. The integrated circuit of claim 7, further comprising:
   a set of miss status holding registers, wherein a miss status holding register in the set of miss status holding registers includes the tag in an entry of the store queue and a physical address of the associated store instruction.

9. The integrated circuit of claim 8, wherein the store-to-load forwarding circuitry is configured to:
   check that one or more forwarding conditions are satisfied by comparing the first physical address to a physical address in the miss status holding register with a tag that matches the tag of the entry.

10. The integrated circuit of claim 6, wherein the function is a hash function such that the tag of the entry is a hash of the virtual address of the store instruction.

11. The integrated circuit of claim 6, wherein the store-to-load forwarding circuitry is further configured to:
    prioritize matching entries of the store queue with tags that match the first virtual address based on program order of respective instructions associated with the matching entries to select the entry as corresponding to a most recent instruction before the first load instruction.

12. The integrated circuit of claim 6, wherein the load unit and the store unit are integrated in a load/store unit of the processor pipeline.

13. A system comprising:
a processor pipeline including a load unit for executing load instructions and a store unit for executing store instructions;
a store queue that has entries associated with respective store instructions that are being executed by the store unit, wherein an entry of the entries includes a tag that is determined by a function that combines a plurality of bits of a virtual address of a store instruction to generate a new value, wherein the tag is separate from the virtual address;
a set of miss status holding registers, wherein a miss status holding register in the set of miss status holding registers includes the tag and a physical address of the store instruction; and
store-to-load forwarding circuitry that is configured to:
  determine a match between a first virtual address of a first load instruction being executed by the load unit and the tag of the entry;
  select the entry of the store queue based on the match; and
  forward, based on the entry being selected, data of the entry in the store queue to be returned by the first load instruction.

14. The system of claim 13, further comprising:
a translation lookaside buffer configured to translate virtual addresses to physical addresses, wherein the first virtual address is compared to tags of the entries in the store queue before a first physical address is determined based on the first virtual address using the translation lookaside buffer.

15. The system of claim 14, wherein the store-to-load forwarding circuitry is further configured to:
check that one or more forwarding conditions are satisfied by comparing the first physical address to a physical address in a miss status holding register in the set of miss status holding registers with a tag that matches the tag of the selected entry.

16. The system of claim 13, wherein the store-to-load forwarding circuitry is further configured to:
prioritize matching entries of the store queue with tags that match the first virtual address based on program order of respective instructions associated with the matching entries to select the entry as corresponding to a most recent instruction before the first load instruction.

* * * * *